No. 857,304. PATENTED JUNE 18, 1907.
G. RICHARDS.
PULLEY.
APPLICATION FILED AUG. 9, 1905.
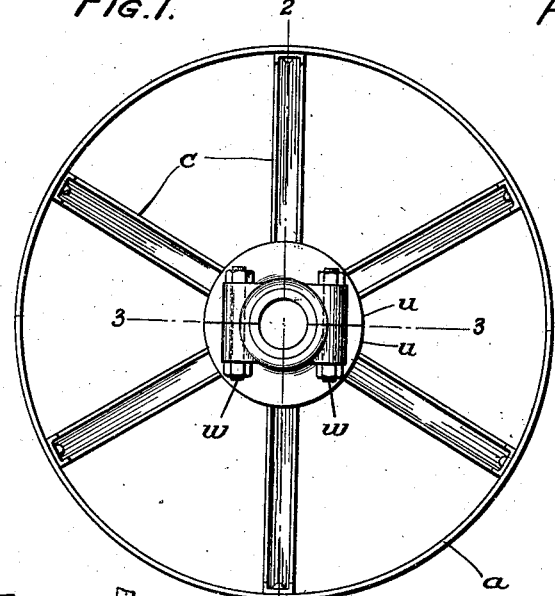
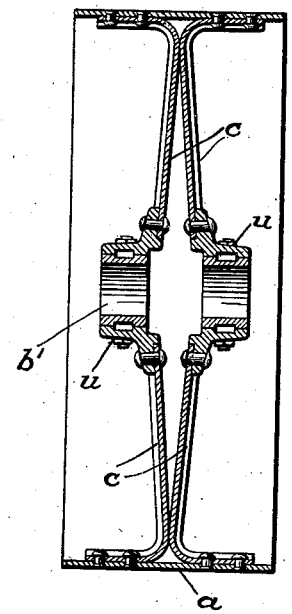
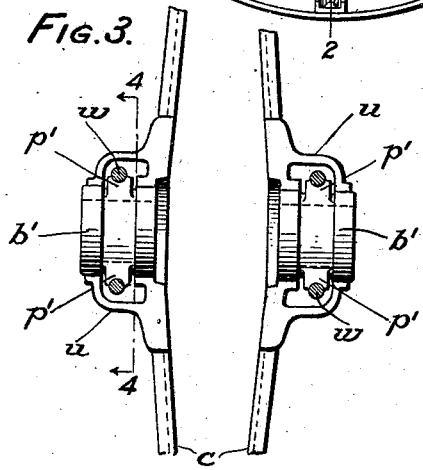
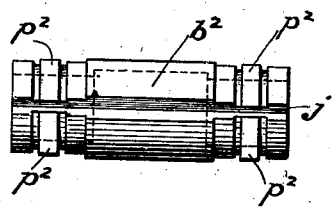
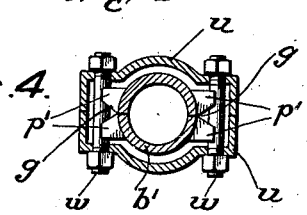
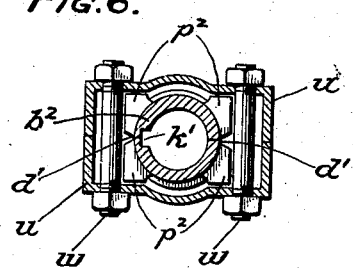
WITNESSES:
INVENTOR
George Richards
BY
Harding & Harding
ATTORNEYS.

UNITED STATES PATENT OFFICE.

GEORGE RICHARDS, OF PHILADELPHIA, PENNSYLVANIA.

PULLEY.

No. 857,304.  Specification of Letters Patent.  Patented June 18, 1907.

Application filed August 9, 1905. Serial No. 273,499.

*To all whom it may concern:*

Be it known that I, GEORGE RICHARDS, a citizen of the United States, residing in the city and county of Philadelphia, State of Pennsylvania, have invented a new and useful Improvement in Pulleys, of which the following is a specification.

The object of my invention is to provide such a construction of hub and separable bushing that the pulley may be placed on shafts of different diameters and of diameters less than the hole through the hub of the pulley.

The invention is more particularly applicable to pulleys made in two parts or halves and especially to that type of pulley comprising two independent hub members, spaced apart and in alinement with each other on the line of the pulley axis, each hub member being made in two parts or halves divided on a plane extending through the axis, and comprising also pairs of arms, the arms of each pair being secured at their inner ends to the two hub members respectively and at their outer ends bent in opposite directions parallel to the pulley axis and secured by rivets to the inner face of the rim.

In the drawings: Figure 1 is a side view of the pulley. Fig. 2 is a section on the line 2—2 of Fig. 1. Fig. 3 is an enlarged section on the line 3—3 of Fig. 1. Fig. 4 is a section on the line 4—4 of Fig. 3. Fig. 5 is a side view of a modified form of bushing. Fig. 6 is a section through the hub similar to Fig. 4, showing the modified form of bushing.

$u, u,$ are the two hub members spaced apart on the line of the axis, each being made in two parts or halves, $c$ represents the arms of the pulley and $a$ the pulley rim. As shown, the arms are arranged in pairs, one arm of each pair being secured to one hub member and the other to the other hub member, all the arms being secured to the rim.

$w, w,$ are bolts by which the two halves of each hub member are clamped together.

The metal bushes used in connection with the pulleys are of two kinds. Where the two hub members are held to the shaft by the clamping force of the bolts in the hub members, two bush members, each preferably formed of two parts or halves, are employed, one bush member being placed in each hub member. Where the pulley is required to be keyed to the shaft, a bush is used which has the necessary key-way in its interior, the bush being made preferably in two parts or halves, the bush being long enough to extend through the two hub members, to retain the hub members the required distance apart and also to enable the keys to be driven between the shaft and the bush without disturbing the relative positions of the two hub members.

The first mentioned form of my invention, illustrated in Figs. 1, 2, 3 and 4 will be first described. The hub members comprise specially shaped hollow casings having extensions on opposite sides forming recesses square-shaped in cross-section, as shown in Fig. 4. The bolts $w$ extend through these recesses. $b', b',$ are the two bush members, each comprising a cylindrical body and projections $p'$ on opposite sides thereof provided with recesses partly embracing the bolts $w$. This engagement of the projections $p'$ with the bolts of the hub prevents the bush members from turning around in the hub and also prevents the bush members moving endwise out of the hub. In casting the bush members, longitudinally extending beveled grooves $g$ are made in the sides of the bush members so that they are each readily broken into two parts or halves. The bushes are made of different thicknesses to fit the bores of hubs of different diameters and to fit shafts of different diameters. They are also made of different lengths to suit hub members of different lengths.

The second mentioned form of my invention illustrated in Figs. 5 and 6, will now be described. This form, as before stated, is especially adapted for use where the pulley is required to be keyed to a shaft. By my invention, provision is made for driving the keys without disturbing the fixed distance between the hubs, and the bushing provides a wall of metal of a sufficient thickness to contain the key groove, such thickness being greater than the maximum desirable or practicable thickness of the wall of the hub. The bush has a length substantially equal to the distance between the outer ends of the two hub sections and has a key-way extending substantially throughout its length, the bush being thus adapted to extend completely through both hub members. $b^2$ is the bush having projections $p^2$. This bush, like the bush members $b'$, is preferably cast in one piece with longitudinally extending beveled grooves $d'$ made in its opposite sides and broken along this groove to form two parts or halves forming, when put together, the joints $j, j$. The key-way $k'$ is shown as formed at one of the joints $j$, although it may be formed in one only of the two parts or halves of the bush between the joints. The hub members $u$ are essentially the same in construction as those described in connection with the first described form of bush. The projections $p^2$, four in number, extend into the square shaped recesses in the interior of the hub members. These projections lock the bush $b^2$ in the hub members so that it cannot turn with relation to the hub, and the bushing, and consequently the pulley, are driven by the key in the shaft. The projections $p^2$ rest against the sides of recesses in the inner wall of the hub members and thus retain the hubs at the required distance apart. The clamp bolts $w, w$, hold the pulley hub members and the bush together to resist the bursting strain of the key.

The specific modification illustrated in Figs. 5 and 6 and especially applicable where a pulley is required to be keyed to a shaft, is not herein specifically claimed, as the same forms the subject of a separate divisional application filed May 1, 1906, Serial No. 314,634.

Having now fully described my invention, what I claim and desire to protect by Letters Patent is:

1. The combination with a hub comprising two hub members spaced apart on the line of the axis, each hub member consisting of hollow castings having extensions on opposite sides forming recesses, of a bush having projections on opposite sides extending into said recesses, said hub and bush being split through a plane parallel to their axis and intersecting said projections and recesses, into parts or halves, and bolts extending through the extensions of the hub outside the projections and securing together the parts or halves of each hub member.

2. The combination with a hub comprising two hub members spaced apart on the line of the axis, each hub member comprising two parts or halves, of a bush comprising two bush members also spaced apart on the line of the axis and contained respectively within the two hub members, and bolts securing together the two parts or halves of each hub member and engaging, but not extending through, the corresponding bush member to hold it in definite relation to the corresponding hub member.

3. The combination, with a hub provided with lateral extensions on opposite sides forming interior recesses and split, through a plane parallel to its axis and intersecting said recesses, into parts or halves, of a bush having laterally extending sides, provided with longitudinally extending grooves, that extend respectively within said recesses and bolts respectively engaging the hub extensions and extending through their recesses and securing together the parts or halves of the hub.

4. The combination with a hub comprising two hub members spaced apart on the line of the axis, each hub member consisting of hollow castings having extensions on opposite sides forming recesses, of a bush having laterally extending sides, provided with longitudinally extending beveled grooves, that extend within said recesses, said bush being split, through a plane parallel to its axis and extending through the bases of said grooves, into parts or halves, and bolts respectively engaging the hub extensions and extending through their recesses and securing together the parts or halves of each hub member.

In testimony whereof I have signed my name to this specification in the presence of two subscribing witnesses.

GEO. RICHARDS.

Witnesses:
L. H. BERRY,
FREDK. W. MYERS.